United States Patent
Marupaduga

(10) Patent No.: US 10,404,330 B1
(45) Date of Patent: Sep. 3, 2019

(54) COORDINATED MULTIPOINT SET SIZE BASED ON QUALITY OF SERVICE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 90 days.

(21) Appl. No.: 15/482,660

(22) Filed: Apr. 7, 2017

(51) Int. Cl.
  *H04B 7/024* (2017.01)
  *H04W 48/20* (2009.01)
  *H04W 28/02* (2009.01)

(52) U.S. Cl.
  CPC ........ *H04B 7/024* (2013.01); *H04W 28/0268* (2013.01); *H04W 48/20* (2013.01)

(58) Field of Classification Search
  CPC ... H04B 7/024; H04W 28/0268; H04W 48/20
  See application file for complete search history.

(56) References Cited

U.S. PATENT DOCUMENTS

| | | | | |
|---|---|---|---|---|
| 9,712,213 | B2* | 7/2017 | Mochizuki | H04W 24/10 |
| 2012/0287790 | A1* | 11/2012 | Huang | H04W 28/10 370/236 |
| 2014/0112288 | A1* | 4/2014 | Wei | H04J 11/0053 370/329 |
| 2014/0369219 | A1* | 12/2014 | Wang | H04B 7/024 370/252 |
| 2016/0204838 | A1* | 7/2016 | Park | H04B 7/024 370/252 |
| 2017/0251388 | A1* | 8/2017 | Persson | H04B 17/318 |

* cited by examiner

*Primary Examiner* — Robert C Scheibel

(57) ABSTRACT

Disclosed herein are methods and systems that can help to determine a maximum size of the cooperating set of cells, which coordinate to provide a user equipment (UE) with coordinated multipoint (CoMP) service. An exemplary method involves: (a) determining, from a plurality of possible communication types, a communication type of a communication associated with a first UE; (b) using the determined communication type as a basis for determining a maximum size for a CoMP cooperating set for the UE, wherein the cooperating set specifies one or more cells to provide CoMP service to the UE; and (c) selecting one or more cells to include in the CoMP cooperating set for the UE, wherein a total number of cells selected is less than or equal to the determined maximum size.

16 Claims, 6 Drawing Sheets

| QCI | Resource Type | Packet Delay Budget | Packet Error Loss | Example Communication Types |
|---|---|---|---|---|
| 1 | GBR | 100 ms | $10^{-2}$ | voice calls |
| 2 | GBR | 150 ms | $10^{-3}$ | video calls |
| 3 | GBR | 50 ms | $10^{-3}$ | real-time games |
| 4 | GBR | 300 ms | $10^{-6}$ | streaming video |
| 5 | non-GBR | 100 ms | $10^{-6}$ | IMS signaling |
| 6 | non-GBR | 300 ms | $10^{-6}$ | TCP-based streaming video |
| 7 | non-GBR | 100 ms | $10^{-3}$ | live video streaming |
| 8 | non-GBR | 300 ms | $10^{-6}$ | TCP-based streaming video |
| 9 | non-GBR | 300 ms | $10^{-6}$ | TCP-based streaming video; default bearer |

Fig. 4

COORDINATED MULTIPOINT SET SIZE BASED ON QUALITY OF SERVICE

BACKGROUND

Many people use mobile stations, such as cell phones, personal digital assistants (PDAs), tablet computers, laptop computers, desktop computers, in-car computers, and so on, to communicate with cellular wireless networks. These WCDs and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

To meet increasing demand for high-speed data on mobile devices, cellular service providers have begun implementing "4G" networks, which provide service under one or more 4G air interface protocols, such a long-term evolution (LTE) protocol. LTE was developed by the $3^{rd}$ Generation Partnership Project (3GPP), and is based on GSM/EDGE and UMTS/HSPA network technology.

In the context of LTE, a mobile station is typically referred to as a "user equipment" (UE), and may take various mobile and stationary forms, such as a mobile phone, tablet computer, laptop computer, desktop computer, or any other device configured for wireless communication. Herein, the terms "mobile station," "wireless communication device" (or WCD), and "user equipment" (or UE) may be used interchangeably. Further, in the context of LTE, a base station is typically referred to as an "eNodeB." Herein, the terms "base station" and "eNodeB" may be used interchangeably.

In a further aspect of some protocols, such as LTE, reception at cell edges may be problematic for various reasons. For example, the greater distance to a base station at a cell edge may result in lower signal strength. Further, at a cell edge, interference levels from neighboring cells are likely to be higher, as the wireless communication device is generally closer to neighboring cells when at a cell edge.

In an effort to improve the quality of service at cell edges, 3GPP LTE-A Release 11 introduced a number of Coordinated Multipoint (CoMP) schemes. By implementing such CoMP schemes, a group or cluster of base stations may improve service at cell edges by coordinating transmission and/or reception in an effort to avoid inter-cell interference, and in some cases, to convert inter-cell interference into a usable signal that actually improves the quality of service that is provided.

LTE-A Release 11 defines a number of different CoMP schemes or modes for both the uplink (UL) and the downlink (DL). For the downlink, there or two basic types of CoMP modes: coordinated scheduling/beamforming (CSCH or DL-CSCH) and joint processing. When coordinated scheduling/beamforming is implemented for a given UE, data is only sent to the given UE in one cell at a time, but scheduling and beamforming decisions for the given UE are coordinated amongst multiple cells. When a type of joint processing referred to as joint transmission is implemented for a given UE, data is transmitted to the UE in multiple cells concurrently. Other types of CoMP schemes on the uplink and downlink also exist.

OVERVIEW

When a user equipment (UE) is provided with coordinated multipoint (CoMP) service, the set of cells that cooperate to provide service to the UE may be referred to as the UE's cooperating set. According to current CoMP implementations, the number of cells in a UE's cooperating set is typically fixed at a predetermined maximum number.

There may be circumstances where increasing the maximum size of a UE's cooperating set is desirable. More specifically, when a greater number of cells cooperate to provide CoMP service to a given UE, the quality of service (QoS) for the UE may improve (e.g., by improving the UE's SINR and thus its throughput). Accordingly, exemplary embodiments may analyze one or more factors that can indicate the desired QoS for a given UE, and use such factors to dynamically adjust the maximum size of the CoMP cooperating set for the UE. In particular, a maximum size parameter may be set and/or up updated on a per-UE basis, such that the maximum size for the CoMP cooperating increases when higher QoS is desired for the communications in which a given UE is engaged or is about to engage in. As a specific example, when a given UE is engaged in a guaranteed bit rate (GBR) communication, the network (e.g., an eNodeB) may detect this and increase the maximum size of the UE's CoMP cooperating, as compared to when the UE is engaged in a non-GBR communication. Other examples are also possible.

More generally, in one aspect, an exemplary method involves an eNodeB or another network entity: (a) determining, from a plurality of possible communication types, a communication type of a communication associated with a first UE, wherein the first UE is capable of CoMP communication via an access network; (b) using the determined communication type as a basis for determining a maximum size for a CoMP cooperating set for the UE, wherein the cooperating set specifies one or more cells to provide CoMP service to the UE; and (c) selecting one or more cells to include in the CoMP cooperating set for the UE, wherein a total number of cells selected is less than or equal to the determined maximum size.

In another aspect, an exemplary system includes a communication interface operable for cellular communications with UE, at least one processor, and program instructions stored in a non-transitory computer readable medium. The program instructions are executable by the at least one processor to: (a) determine, from a plurality of possible communication types, a communication type of a communication associated with a first UE, wherein the first UE is capable of CoMP communication via an access network; (b) based at least in part on the determined communication type, determine a maximum size for a CoMP cooperating set for the UE, wherein the cooperating set specifies one or more cells to provide CoMP service to the UE; and (c) select one or more cells to include in cooperating set for the UE, wherein a total number of cells selected is less than or equal to the determined maximum size.

In a further aspect, another exemplary method involves an eNodeB or another network entity: (a) determining, from a plurality of possible communication types, a communication type of a first communication associated with a UE, wherein the UE is capable of CoMP communication via an access network; (b) determining, from the plurality of possible communication types, a second communication type of a second communication associated with the UE; (c) based at least in part on the first communication type, determining a first value for a maximum size parameter, wherein the maximum size parameter indicates a maximum number of cells that can be selected for a CoMP cooperating set that coordinate to provide CoMP service to the UE; (d) based at least in part on the second communication type, determining a second value for a maximum size parameter, setting a maximum size parameter to a greater of the first value and second value; and (e) selecting one or more cells to include in cooperating set for the UE, wherein a total number of cells selected is less than or equal to the determined maximum size.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

Exemplary embodiments of the present invention is described herein with reference to the drawings, in which:

FIG. 4 is a table illustrating parameters of quality of service class identifiers, according to exemplary embodiments.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Further, methods and systems may be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

I. EXEMPLARY NETWORK ARCHITECTURE

Figure 1A:
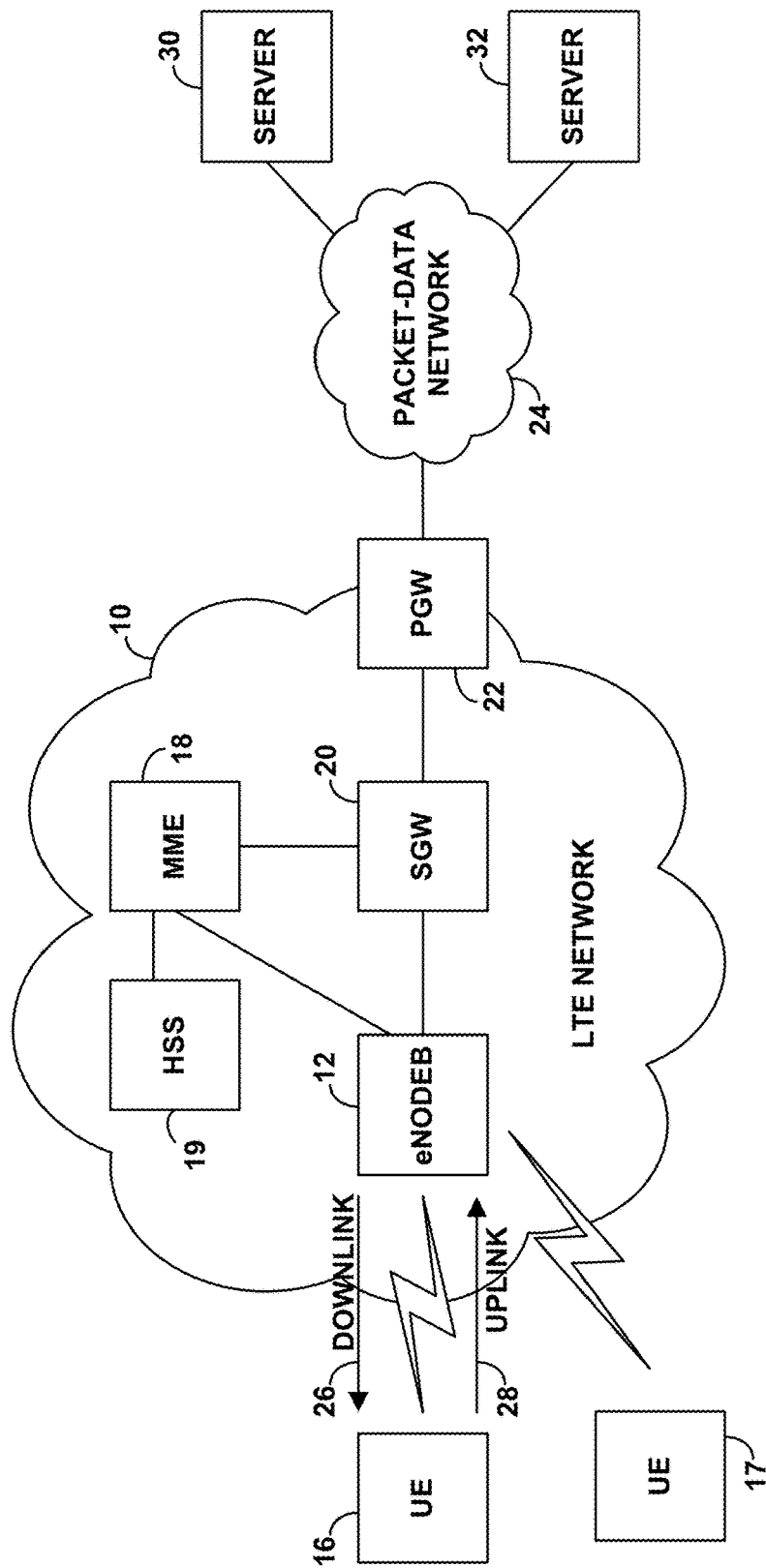
FIG. 1A is a simplified block diagram of a wireless communication system, according to exemplary embodiments.

Referring to the drawings, FIG. 1A is a simplified block diagram of a wireless communication system in which the present method and system can be implemented. In particular, FIG. 1A depicts a representative LTE network 10, which functions primarily to serve UEs with wireless packet data communication service, including possibly voice-over-packet service, but may also provide other functions. As shown, the LTE network 10 includes a base station (eNodeB) 12, which has one or more antenna structures and associated equipment for providing one or more LTE coverage areas (e.g., cells) in which to serve UEs such as an example UE 16 as shown.

The eNodeB 12 has a communication interface with a mobility management entity (MME) 18 that functions as a signaling controller for the LTE network 10. Further, the eNodeB 12 has a communication interface with a serving gateway (SGW) 20. MME 18 may be communicatively coupled to a home subscriber server (HSS) 19, which stores subscriber information, and may also be communicatively coupled to the SGW 20. SGW 20 in turn has a communication interface with a packet-data network gateway (PGW) 22, which may provide connectivity with a packet-data network 24. In practice, the illustrated components of the LTE network 10 may sit as nodes on a private packet-switched network owned by an operator of the LTE network 10, and thus the various communication interfaces may be logical interfaces through that network.

As illustrated, the air interface 14 for a given cell served by eNodeB 12 may have a downlink direction 26 from the eNodeB 12 to the UE 16, and an uplink direction 28 from the UE 16 to the eNodeB 12. Further, the eNodeB 12 and the UE 16 may be configured (e.g., licensed and programmed) to support air interface communication on various particular carriers, which may be FDD or TDD, for example. Each such carrier and/or its particular downlink and uplink channels may be identified by one or more globally unique identifiers per industry standard, so that the eNodeB 12 and a served UE can refer to particular carriers by those identifiers.

According to LTE, each carrier's downlink channel may then define various sub-channels, such as a physical downlink control channel (PDCCH) for carrying scheduling directives and other control signaling from the eNodeB 12 to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB 12 and a physical uplink shared channel (PUSCH) for carrying scheduled uplink data communication.

With this arrangement, when the UE 16 enters into coverage of the eNodeB 12, the UE 16 may detect the eNodeB's 12 coverage on a particular carrier, and the UE 16 may engage in an attach process or handover process to register with the LTE network 10 on that carrier. For instance, the UE 16 may initially transmit to the eNodeB 12 an attach request, which the eNodeB 12 may pass along to the MME 18, triggering a process of authenticating the UE 16 and establishment of one or more logical bearer connections for the UE 16 between the eNodeB 12 and the PGW 22. For example, LTE network 10 may initially establish a default bearer for carrying general Internet traffic (e.g., web browsing, e mail messaging, or the like) between UE 16 and packet-data network 24. As another example, if UE 16 subscribes to an IMS-based service such as VoIP, LTE network 10 may initially establish an IMS signaling bearer for carrying control signaling (e.g., SIP signaling) between UE 16 and IMS platform (not shown) to facilitate setup of IMS-based communication sessions.

Each of these bearers may have a designated quality-of-service (QoS) level or traffic class. In one implementation, this QoS level or traffic class may be represented as a QoS class indicator (QCI), which defines various QoS parameters (e.g., priority, delay, loss rate, etc.) for how the entities of the LTE network are to handle the packet-data transmission on the bearer. QCI values typically range from 1 to 9, with a QCI of 1 representing the highest QoS level and a QCI of 9 representing the lowest QoS level (sometimes referred to as "best efforts"). Using these QCI values as a point of reference, the LTE network may normally select a QCI of 9 for the default Internet bearer and a QCI of 5 for the IMS signaling bearer (but other QCI values could be used as well).

In a further aspect of LTE, the eNodeB 12 may determine the communication type of a communication for which a UE 16 has requested resources and/or in which a UE 16 is engaged in various ways. For instance, when a UE attaches to the network and/or when a UE 16 sends a service request to initiate a communication, the eNodeB 12 may determine the website or destination server indicated by the request (e.g., as indicated by an IP address included in the request). The eNodeB 12 may then determine a communication type that is typically associated with the website or destination server. Additionally or alternatively, the eNodeB 12 may determine a communication type based on deep packet inspection (DPI) of one or more packets passing to or from the UE 16, and/or based on various associated signaling or other data.

To do this, the eNodeB 12 may include or have access to a table that maps various websites, network addresses and/or port numbers to corresponding types of content (e.g., indicating for each network address one or more possible types of content, and further indicating for each port associated with data sent to or from that network address a corresponding type of content), and the eNodeB 12 may be programmed to refer to that table to determine the communication type, which may be indicative of the type of content and/or the manner in which content is communicated during a particular communication.

Other techniques for determining the communication type of a communication associated with a UE are also possible.

II. COORDINATED MULTIPOINT

As noted above, a network such as communication network 10 may implement various types of coordinated multipoint (CoMP) service, through which base stations (e.g., eNodeBs) may coordinate to improve uplink and/or downlink service. As noted above, CoMP schemes designed for coordinated transmission by base stations may be referred to as downlink CoMP modes, while CoMP schemes designed for coordinated reception may be referred to as uplink CoMP modes.

Figure 1B:
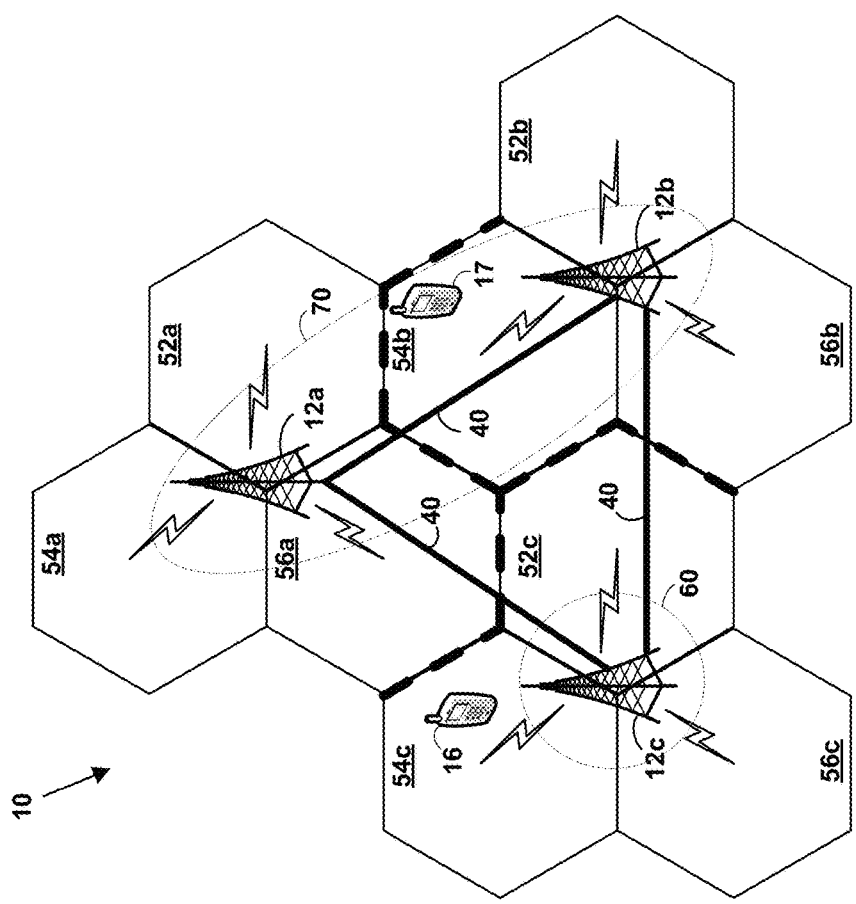
FIG. 1B is a simplified block diagram illustrating a portion of a communication network in which coordinated multipoint service may be provided, according to exemplary embodiments.

FIG. 1B is a simplified block diagram illustrating a portion of communication network 10 in which CoMP schemes may be implemented for uplink and/or downlink communications. In particular, FIG. 1B shows a portion of an LTE network, which includes three eNodeBs 12a to 12c. More or less eNodeBs, and/or other types of access points or base transceiver stations, are also possible.

As shown, eNodeB 12a is serving three coverage areas or cells 52a, 54a, and 56a, eNodeB 12b is serving three coverage areas or cells 52b, 54b, and 56b, and eNodeB 12c is serving three coverage areas or cells 52c, 54c, and 56c. Further, a UE 16 is operating in cell 54c, which is served by eNodeB 12c. Further, while not shown in FIG. 1B, each eNodeB 12a to 12c may be configured in the same or in a similar manner as the eNodeB 12 shown in FIG. 1A. For instance, each eNodeB 12a to 12c may be communicatively coupled to an MME and/or an SGW. Further, note that some or all of eNodeBs 12a to 12c may be communicatively coupled to the same MME and/or the same SGW. Alternatively, each eNodeB 12a to 12c might be connected to a different MME and/or different SGW.

In some cases, CoMP may be implemented by a single base station, which provides service in multiple cells. This type of CoMP scheme may be referred to as an "intra base station" or "intra-eNodeB" CoMP scheme. For example, eNodeB 12c may provide downlink CoMP by jointly transmitting data to a UE in two or more of the cells 52c, 54c, and 56c that are served by eNodeB 12c. In particular, eNodeB 12c may define a CoMP coordinating set 60 for a UE to include all its cells 52c, 54c, and 56c. As such, eNodeB 12c may use joint transmission techniques to transmit the downlink signal to UE 16 in two or more of the cells 52c, 54c, and 56c that are served by eNodeB 12c.

In other cases, CoMP may be implemented by multiple base stations, which may each provide service to a given UE one cell or multiple cells. This type of CoMP scheme may be referred to as an "inter base station" or "inter-eNodeB" CoMP scheme. For example, eNodeBs 12a and 12c may provide downlink CoMP to UE 17 by jointly transmitting the same data to UE 17 in two or more of cells 52a, 54a, 56a, 52b, 54b, and 56b.

When CoMP involves multiple base stations (e.g., inter-base station CoMP), the base stations may coordinate with one another via a backhaul network, which allows for communications between base stations and/or other network components. For example, in an LTE network, eNodeBs may communicate via links that are referred to as X2 interfaces. X2 is described generally in Technical Specification ETSI TS 136 420 for LTE; Evolved Universal Terrestrial Radio Access Network (E-UTRAN); X2 general aspects and principles. In FIG. 1B, eNodeBs 12a to 12c are communicatively connected via X2 links 40. It should be understood, however, that other types of backhaul communications are also possible.

When a joint transmission (JT) CoMP scheme is implemented on the downlink, the downlink signal can be transmitted to UE 16 in multiple cells simultaneously. As such, a UE can combine downlink signals received in multiple cells to improve reception and/or quality of service. For example, if cells 56a, 52c, and 54c are coordinated to provide CoMP to UE 16, then UE 16 may combine the downlink signals from these cells.

In practice, the eNodeB(s) serving the cells in a given UE's cooperating set may share data that is intended for the given UE, so that the data may be jointly processed and transmitted. For example, if the cooperating set for UE 16 includes cells 56a, 52c, and 54c, then eNodeBs 12a and 12c may coordinate in an effort to improve pre-coding matrices for inter-cell coordination, such that the SINR increases at UE 16. After applying such pre-coding at each eNodeB 12a and 12c, eNodeBs 12a and 12c then transmit to the UE 16 on the same resource block of the physical downlink shared channel (PDSCH) in cells 52c, 54c and 56a.

In a further aspect, the set of cells that cooperate to provide CoMP service to a given UE may be referred to herein as the UE's "cooperating set". The cooperating set for a given UE is the set of geographically separated points (e.g., cells) that are directly or indirectly engaged in downlink CoMP service for the UE (e.g., directly or indirectly participating in PDSCH transmission to the UE). In some cases, all UEs in the cooperating set transmit to the UE. However, depending upon the particular CoMP scheme and/or other factors, only a subset of the coordinating set transmit the PDSCH to the UE in each frame. The subset of the cooperating set that transmit to a given UE are referred to as the UE's "transmission points." (In the case, where all cells in the cooperating set transmit the PDSCH to the UE, the UE's transmission points and cooperating set are identical.)

The cooperating set for a given UE 16 may include a "serving cell" and one or more other "cooperating cell(s)". The other cells coordinating the UE's downlink transmissions with the serving cell (also referred to as "transmission points" for the UE) will mirror the serving cell's physical DL shared channel (PDSCH) configuration for the UE. Note that in some implementations, the same cooperating set may provide both uplink and downlink CoMP service to a given UE. Alternatively, the uplink CoMP cooperating set for a given UE may differ from the cooperating set that provides downlink CoMP service to the given UE.

The UE's serving cell may be assigned to the UE in various ways. For example, the serving cell may be the cell for which the UE measures the highest Reference Signal Received Power (RSRP). Of course, other techniques for selecting the serving cell are also possible. Further, in some implementations of CoMP, the serving cell for a given UE may be dynamically updated as network conditions change.

In an LTE network, the eNodeB for the serving cell in a UE's CoMP cooperating set (or another network entity) may determine the other cell or cells that coordinate to provide CoMP service to UE (i.e., the other cells in the cooperating set), at a given point in time. Alternatively, the cooperating set may be determined, and the serving cell for a UE may then be selected from the UE's cooperating set.

In some embodiments, the cooperating set for a given UE 16 may be determined dynamically, based on various factors. For instance, the eNodeB for the serving cell of UE 16, and/or another network entity or entities, may initially determine a "measurement set" for which the UE is instructed to measure certain channel state information (CSI). The selection of cells to include in the measurement set may be based on various criteria, such as criteria indicating signal strength, signal quality, and/or other channel conditions. For instance, each transmission point in an LTE network may transmit a CSI reference signal (CSI-RS) and/or a cell-specific reference signal (CRS). A UE may scan for these signals and provide regular radio resource management reports, which include measurements based on the CSI-RS and/or CRS for signals it has detected, such as a channel quality indicator (CQI), a rank indicator (RI), and/or a precoder matrix indicator (PMI), among other possibilities. These measurement may then be used by the LTE network to determine a measurement set for the UE. Alternatively, cells in measurement sets could be pre-defined (e.g., as clusters of adjacent cells).

Once provided with a measurement set, the UE 16 measures and reports certain channel state information (CSI) for the cells in the measurement set. For instance, the UE 16 may report CSI-based measurements for cells in the measurement set in the form of a reference signal received power (RSRP) report and/or a reference signal received quality (RSRQ) report. The set of cells for which the UE actually reports channel state information is referred to as the UE's "reporting set." (In some CoMP implementations, the UE is permitted to down-select from the measurement set when reporting channel state information. In other words, the UE may selectively report channel state information for only a subset of the cells in the measurement set. In such cases, the reporting set will be a subset of the UE's measurement set.)

Once a UE 16 has provided the network with channel state information for the reporting set, the network (e.g., the eNodeB operating the UE's serving cell) uses this channel state information to select the cooperating set for the UE. More specifically, the eNodeB may use the reported channel state information (e.g., as reported in the RSRP and/or RSRQ) and/or other information to select cells from the reporting set for inclusion in the UE's cooperating set.

In some CoMP implementations, the network (e.g., the eNodeB operating the UE's serving cell) may perform further analysis to select a subset of the cooperating set to serve as the UE's transmission points for CoMP. In such cases, the selection of eNodeBs for the cooperating set may be based on various factors, including, but not limited to, whether or not a signal from the given UE is received in a candidate cell, signal strength measurements, other indicators of air interface conditions, and/or processing load at eNodeBs serving cells in the measurement set, among other possibilities.

III. QoS CLASS IDENTIFIERS

As noted above, each of a UE's bearer connections with an LTE network may be assigned a QoS class indicator (QCI), which defines various QoS attributes for the communication using that bearer. As further noted above, QCI values typically range from 1 to 9, with a QCI of 1 representing the highest QoS level and a QCI of 9 representing the lowest QoS level (sometimes referred to as "best efforts").

In some embodiments, QCI 1 to QCI 4 may be defined so as to provide a guaranteed bit rate (GBR) to traffic flows assigned thereto, and thus may be referred to as GBR QCIs. Further, QCI 5 to QCI 9 may be defined so as to provide a variable bit rate for traffic flows assigned thereto, and thus may be referred to as non-GBR QCIs. As such, QCIs 5 through 9 may correspond to non-guaranteed bit rate types of wireless communication, such as IMS signaling, TCP-based communications (e.g., Web browsing, email, chat, FTP, etc.), as well as non-guaranteed bit rate voice and video services, among other possibilities.

In an exemplary LTE network, a QCI 1 bearer is provided with a high level of service quality and may therefore be assigned for conversational voice communications, such as VoIP calls and VoLTE calls. Further, a QCI 4 bearer is a GBR bearer having a mid-level of QoS and is associated specifically with non-conversational video streaming, whereas a QCI 5 bearer is a best-efforts (non-GBR) bearer having mid-level QoS, which can be assigned for IMS signaling, and a QCI 9 bearer is a best-efforts bearer having low-level QoS and is associated specifically with general Internet (e.g., TCP-based) traffic such as e-mail, chat, file transfer, video (buffered streaming), and the like.

In practice, when a UE engages in a communication via an LTE network, the uplink and/or downlink traffic flows may be assigned the QCI that is associated with the particular type of application and/or the particular type of traffic flow. Accordingly, the QCI assigned for a particular communication may be used as an indicator of communication type. (Note that the QCI may be the sole indicator of communication type, or could be used in combination with other information to determine communication type.)

In a further aspect of some implementations, the QCI may be used as an indication of a data-usage class associated with a UE. More specifically, a service provider may have configured network 10 such that assignment of QCIs for a given UE's communications is further based on the data usage class indicated by the user account or accounts associated with the given UE. In an exemplary embodiment, network 10 may associate QCI 8 with user accounts that utilize significantly more network resources than average (e.g., more than some threshold amount of data per month), and may select a QCI other than QCI 8 for communications associated a user account that is not designated as a heavy user (e.g., those that use less than some threshold amount of data per month).

Thus, when a user account indicates a particular user has utilized more than a threshold amount of data in a billing cycle, the user account may be associated with a heavy data-usage class, such that QCI 8 will be assigned to communications of UEs associated with such accounts when it otherwise might not be. Other user accounts may be associated with a standard data-usage class. More granular definition of three or more data-usage classes is also possible.

As a specific example, in FIG. 1B, UE 16 may be associated the user-account of a heavy user, while UE 17 may be associated with the user-account of a normal or standard user. As such, eNodeB 12 may assign QCI 8 to traffic flows to and from UE 16, and may assign other QCIs to the same types of traffic flows to and from UE 17 (e.g., for the same types of communications).

When an LTE network is configured to assign QCI 8 to communications of heavy data users, the QCI of a given communication can also be used as an indicator of the data-usage class. For example, when a UE 16 is assigned QCI 8 for a given communication, eNodeB 12 may infer that the UE 16 is associated with the account of a heavy data user. And, when a UE 17 is assigned QCI 1, QCI 5, or QCI 9, for example, eNodeB 12 may infer that the UE 17 is associated with the account of a standard user (or simply that the UE is not classified by a heavy data-usage class).

IV. EXEMPLARY NETWORK COMPONENTS

Figure 2:
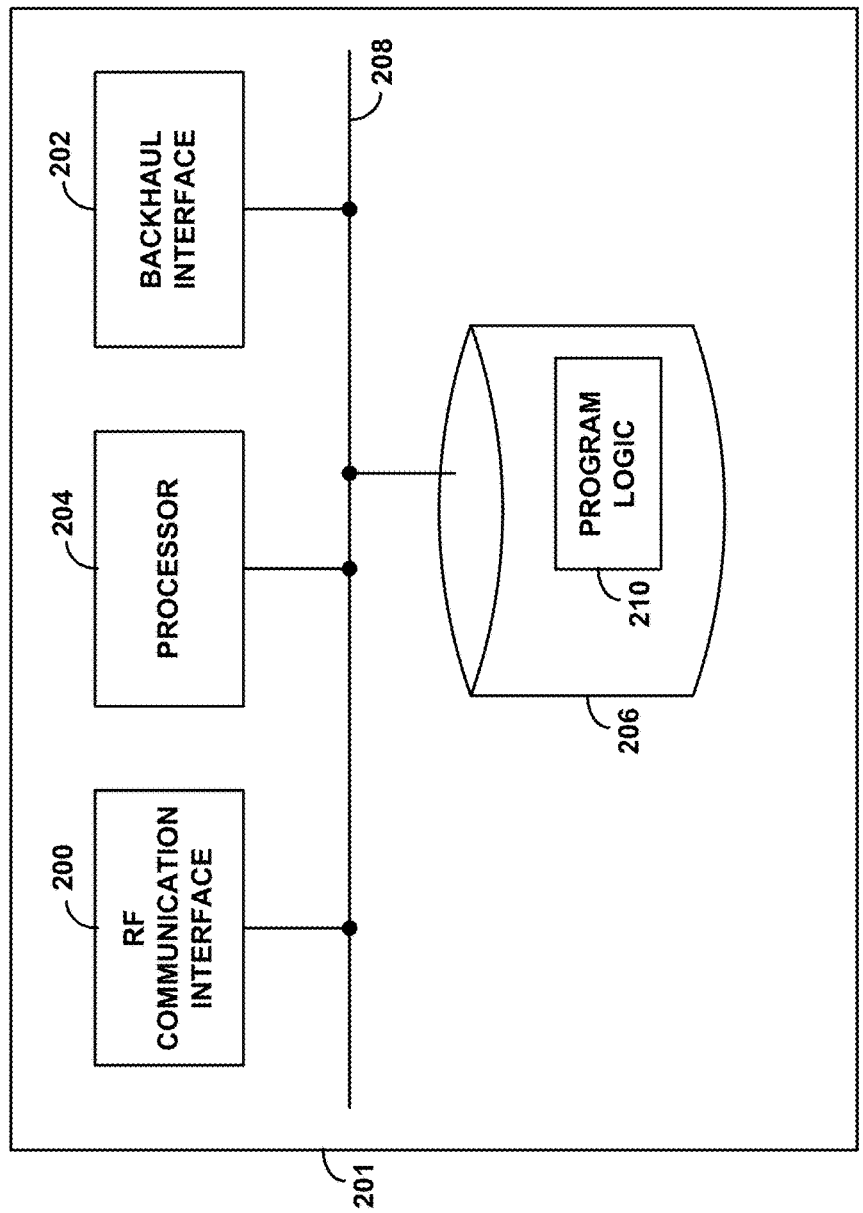
FIG. 2 is a simplified block diagram exemplifying a network component, according to exemplary embodiments.

FIG. 2 is a simplified block diagram exemplifying a network component, according to an exemplary embodiment. In particular, FIG. 2B illustrates functional components that might be found in a network component 201 that is arranged to operate in accordance with the embodiments herein. As shown, the network component 201 may include a communication interface 200, a backhaul interface 202, a processor 204, and data storage 206, all of which may be communicatively linked together by a system bus, network, or one or more other connection mechanisms 208.

In practice, network component 201 may take the form of an eNodeB, or may take the form of another component of an LTE or CDMA network. Further, the illustrated components of network component 201 (e.g., communication interface 200, a backhaul interface 202, a processor 204, and/or data storage 206) may be distributed and/or subdivided between one or more entities in an LTE network and/or in a CDMA network. It should be understood that an exemplary system may also take the form of another network entity or combinations of other network entities, without departing from the scope of the invention.

In network component 201, communication interface 200 may comprise one or more or wired or wireless communication interfaces and/or other associated equipment for engaging in communications with other network entities and/or for engaging in RF communications with mobile stations according to one or more air interface protocols. Chipsets, antennas, and/or other components for such RF communications are readily available and well known to those skilled in the art. Backhaul interface 202 may comprise any sort of communication link or mechanism enabling the network component 201 to exchange signaling and bearer data with other network entities, such as an X2 link, for instance. Further, processor 204 may comprise one or more processors (e.g., general purpose and/or special purpose processors), such as microprocessors for instance. Chipsets, ports, and/or other components for such backhaul communications are readily available and well known to those skilled in the art.

Data storage 206 may be a non-transitory computer readable medium. For example, data storage 206 may take the form of one or more volatile and/or non-volatile storage components, such as magnetic, optical, or organic storage components, integrated in whole or in part with processor 204. As further shown, data storage 206 contains program logic 210 (e.g., machine language instructions) executable by processor 204 to carry out various functions, such as the functionality of the exemplary methods and systems described herein.

In an exemplary embodiment, communication interfaces 200 may include an RF communication interface configured to receive an uplink signal from a UE in a first cell. Further, the network component may include program instructions stored in data storage 206, which are executable by processor 204 to carry out the functionality of a base station (e.g., an eNodeB) and/or other network components described herein.

V. EXEMPLARY METHODS

Figure 3:
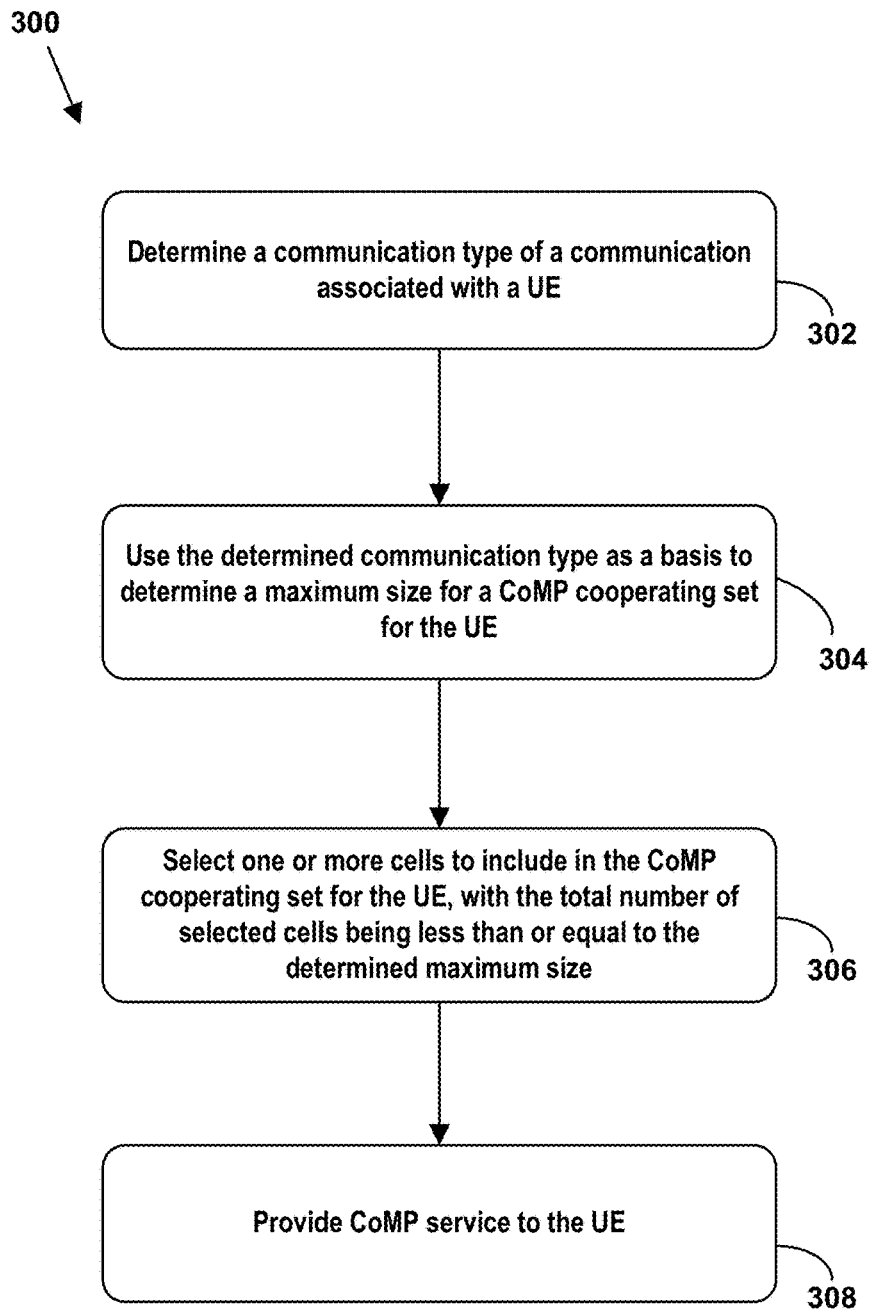
FIG. 3 is flow chart illustrating a method, according to exemplary embodiments.

FIG. 3 is flow chart illustrating a method 300, according to an exemplary embodiment. Method 300 may be implemented by a base station (e.g., an eNodeB). Of course, it should be understood that method 300 or portions thereof may be implemented by other entities or combinations of entities, and/or may be implemented for other purposes, without departing from the scope of the invention.

As shown by block 302, method 300 involves an eNodeB determining, from a plurality of possible communication types, a communication type of a communication associated with a UE. (Note that in this embodiment, it is assumed that the UE is capable of uplink and/or downlink CoMP communication.) The eNodeB then uses the determined communication type as a basis to determine a maximum size for a CoMP cooperating set for the UE, as shown by block 304. The eNodeB then selects one or more cells to include in CoMP cooperating set for the UE, with the constraint that the total number of cells must be less than or equal to the determined maximum size, as shown by block 306. The eNodeB (perhaps through coordination with one or more other eNodeBs) may then provide CoMP service to the UE via the cells selected for the cooperating set, as shown by block 308.

A. Determining the Communication Type

At block 302, the eNodeB may use various techniques to determine the communication type of a UE's communication. In exemplary embodiments, the determined communication type may take the form of QoS level, or QoS measure, associated with the communication. For example, as noted above, an eNodeB 12 can determine the type of QCI assigned to a bearer, and interpret the QCI as an indication of the type of communication for which the UE is requesting and/or utilizing the bearer.

In some embodiments, block 302 may involve determining the QCI corresponding to the communication type, and then determining whether the resource type of the QCI is GBR or non-GBR. For example, FIG. 4 shows a table 400, indicating the resource type for each of QCIs 1 to 9. In particular, table 400 shows whether each QCI 1 to 9 provides for GBR or non-GBR communication. Accordingly, data such as that provided in table 400 may be used at block 302 to determine whether the communication type corresponds to GBR or non-GBR communication.

In some embodiments, block 302 may involve additionally or alternatively involve determining whether or not a communication is classified as a latency-sensitive communication. More specifically, certain types of communications for which the QoS depends substantially upon latency and/or the block error rate (BLER), may be classified as latency-dependent. Examples of such communications include a Voice-over-LTE (VoLTE) calls and other types of Voice-over-IP (VoIP) calls, among other possibilities. Accordingly, at block 302, the eNodeB may determine the QCI assigned to a communication, and determine whether or not the assigned QCI corresponds to a latency-sensitive communication type.

In some embodiments, block 302 may involve determining whether or not the communication is being conducted by a heavy data user. As noted above, an eNodeB 12 may assign QCI 8 to traffic flows to and from UE 16, and may assign other QCIs to the same types of traffic flows to and from UE 17 (e.g., for the same types of communications). Accordingly, at block 302, the eNodeB may determine whether or not a bearer for the UE's communication is assigned a QCI 8. If the communication is assigned QCI 8, then the communication type may be determined to be a "heavy-user" communication.

Additionally or alternatively, block 302 may involve the UE determining the application or the type of application for the UE is requesting and/or utilizing network resources. To determine the type of application, the UE may analyze a request and/or packet data to determine, e.g., an IP address of a destination server or the type of application session to which the packet data in a communication belongs. Further, in some embodiments, the eNodeB may determine both the QCI assigned to the bearer for a communication, and the application type (e.g., as indicated by a destination server), in order to select the uplink CoMP enhancement mood that should be utilized for a UE. By so doing, the eNodeB can potentially differentiate between different applications with the same QCI, when determining the maximum size of the CoMP cooperating set.

To determine the application associated with a given communication, the eNodeB 12 may include or have access to a table that maps various websites, network addresses and/or port numbers to corresponding types of content (e.g., indicating for each network address one or more possible types of content, and further indicating for each port associated with data sent to or from that network address a corresponding type of content), and the eNodeB 12 may be programmed to refer to that table to determine the communication type, which may be indicative of the type of content and/or the manner in which content is communicated during a particular communication.

It should be understood that the techniques for determining communication type described herein are not intended to be limiting. Other techniques for determining the communication type are also possible.

B. Determining the Maximum Size for the CoMP Cooperating Set

As noted above, block 304 of method 300 involves use of the determined communication type as a basis for determining a maximum size for a CoMP cooperating set for the UE.

In some embodiments, the maximum size may be determined based at least in part on the QCI assigned to the communication. For example, an eNodeB and/or another network component may include or have access to QCI-level-to-maximum-size mapping data. The QCI-level-to-maximum-size mapping data may be provided in the form of database, which includes entries for different QCIs, and indicates a respective value of a maximum size parameter for each of these QCIs. As such, an eNodeB and/or another network may utilize such QCI-level-to-maximum-size mapping data as a basis for determining the maximum size for the cooperating set, which corresponds to a particular communication type.

In embodiments where block 302 involves a determination as to whether the communication is a GBR or non-GBR communication, the maximum size determined at block 304 may vary according to whether the communication is a GBR or non-GBR communication. For example, when the assigned QCI provides a GBR for the communication, the eNodeB may set the maximum size parameter to a first value. And, when the resource type of QCI to the bearer for the communication is non-GBR, the eNodeB may set the maximum size parameter to a second value, which is less than the first value. With this implementation, the maximum size of the CoMP cooperating set for a UE engaged in GBR communications will be greater than the maximum size of the CoMP cooperating set for a UE engaged in only non-GBR communications. Thus, by increasing the maximum size of the cooperating set, a greater number of cells can coordinate to provide CoMP service to a UE engaged in GBR communications, which in turn can improve QoS for the UE engaged in GBR communications (as compared to another UE engaged only in non-GBR communications.

In embodiments where block 302 involves a determination as to whether or not the particular communication is classified as a latency-sensitive application, the maximum size determined at block 304 may vary according to whether or not the communication is classified as latency-sensitive. For example, when the assigned QCI corresponds to a communication type that is classified as being latency-sensitive (or it is otherwise determined that the communication is classified as latency-sensitive), the eNodeB may set the maximum size parameter to a first value. And, when the assigned QCI corresponds to a communication type that is not classified as being latency-sensitive (or it is otherwise determined that the communication is not classified as latency-sensitive), the eNodeB may set the maximum size parameter to a second value, which is less than the first value. With this implementation, the maximum size of the CoMP cooperating set for a UE engaged in latency-sensitive communication will be greater than the maximum size of the CoMP cooperating set for a UE engaged in only non-latency-sensitive communication. Thus, by increasing the maximum size of the cooperating set, a greater number of cells can coordinate to provide CoMP service to a UE engaged in latency-sensitive communications, which in turn can improve QoS for the UE engaged in latency-sensitive communications (as compared to another UE engaged only in non-latency-sensitive communications).

In embodiments where block 302 involves a determination as to whether or not the a UE's communication is a heavy-user communication (e.g., whether QCI 8 is assigned to the bearer for the communication), block 304 may involve the eNodeB determining the maximum size parameter to be a lower value than it otherwise would, when the communication is deemed to be a heavy-user communication.

In a further aspect, once the maximize size corresponding to a given communication type is determined at block 304, the eNodeB may put this maximize size into effect by setting a maximum size parameter equal to the determined value. In exemplary embodiments, the maximum size parameter indicates a maximum number of cells that can be included in the cooperating set for the UE. Further, such a maximum size parameter may be implemented as a setting for CoMP at the eNodeB and/or at other network entities.

C. Selecting Cells for the CoMP Cooperating Set

At block 306, selection of cells for inclusion in a UE's cooperating may be accomplished in various ways, provided that the selection is constrained by the maximize size determined at block 304. For example, as detailed above, the UE's cooperating set may be selected from a CoMP measurement set, based on criteria such as certain CSI- and/or CSR-based measurements. Other examples are also possible.

D. Additional Actions Affecting Size of CoMP Cooperating Set

Exemplary embodiments may be utilized in an effort to increase the size of the CoMP cooperating set for a UE, when a certain factor or factors indicate that a higher QoS is desirable for the UE's communications. More specifically, increasing the maximum size for a UE's CoMP cooperating set can allow for more cells to jointly receive and/or jointly transmit signals from and/or to the UE, which in turn can improve QoS for the UE.

However, increasing the maximum number of cells for a UE's CoMP cooperating set does not guarantee that the maximum number of cells will actually be included in the UE's cooperating set. Since other criteria must still be met in order for a cell to be included (e.g., meeting certain threshold requirements based on CSI-RS, etc.), scenarios exist where increasing the maximum size of the CoMP cooperating set will not result in an increase to the actual number of cells selected for the cooperating set.

To address such scenarios, some embodiments may involve taking further actions, when the communication type is identified as one for which higher QoS is desirable. For instance, in addition to using the determined communication type as a basis for determining the maximum size for the CoMP cooperating set, the eNodeB may use the determined communication type as a basis for adjusting at least one other parameter affecting a likelihood that a given cell will be included in the CoMP cooperating set for the UE. For example, the eNodeB could reduce the threshold for a CSI- and/or CRS-based measurement, which is must be met in order to include a cell in the cooperating set. By making such criteria for inclusion in a particular UE's cooperating set more lenient, the eNodeB may improve the likelihood or probability that the maximum number allowed number of cells will be included in the UE's cooperating set. Other examples are also possible.

E. Determining Maximum Cooperating Set Size when a UE has Multiple Concurrent Communication Sessions In various scenarios, a UE may have two or more concurrent communication sessions. For example, while a user is interacting with a social network application, a file download may be proceeding in the background. As another example, a user may be playing music via a streaming music application, while playing a video game that utilizes network connectivity. Many other examples are also possible.

In some embodiments, the network (e.g., an eNodeB) may be configured to reconcile the scenario where a UE is engaged (or has requested initiation of) multiple communication sessions of different communication types. For example, FIG. 5 shows another method, according to an exemplary embodiment.

Figure 5:
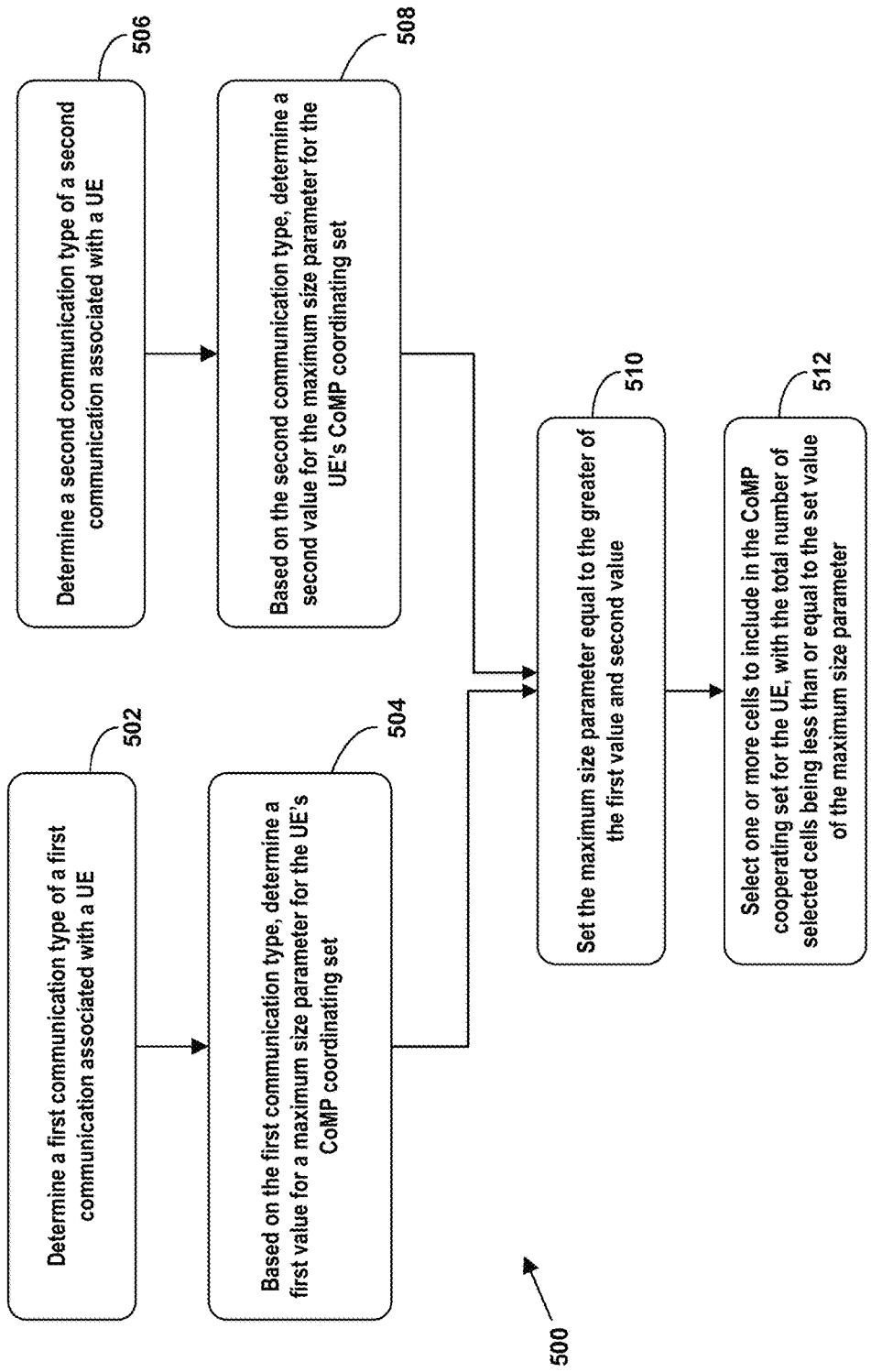
FIG. 5 is a flow chart illustrating another method, according to exemplary embodiments.

FIG. 5 involves an eNodeB determining, from a plurality of possible communication types, a communication type of a communication associated with a UE, as shown by block 502. Then, based at least in part on the first communication type, the eNodeB determines a first value for a maximum size parameter, which indicates a maximum number of cells that can be selected for a CoMP cooperating set providing CoMP service to the UE, as shown by block 504. However, when performing method 500, the eNodeB does not necessarily set the maximum size parameter to the first value. Rather, the eNodeB determines a second communication type of a second communication associated with the UE, as shown by block 506. Furthermore, based at least in part on the second communication type, the eNodeB determines a second value for the maximum size parameter, as shown by block 508. (Note that block 506, or both block 506 and 508, may be performed before block 502 and/or block 504, in between blocks 502 and 504, or after blocks 502 and 504.)

In some embodiments, exemplary methods may implemented in an effort to better tailor the CoMP coordinating set to the communication session having the highest QoS requirements. In method 500, this policy is implemented by setting the maximum size parameter equal to the greater of the first value and second value, as shown by block 510. The eNodeB may then select one or more cells to include in CoMP cooperating set for the UE, with the constraint that the total number of cells must be less than or equal to the set value of the maximum size parameter, as shown by block 512.

Further, in some embodiments, method 500 may be extended to and implemented in scenarios where a UE is engaged in more than two different types of communication sessions. More specifically, if the UE is engaged in three or more different types of communication sessions, the eNodeB may determine a corresponding value of the maximum size parameter for each of the three or more different communication types associated with the UE's communications. The corresponding values may then be compared, and the maximum size parameter can be set to the greatest of the corresponding values.

In a further aspect, method 500 could be performed when (e.g., in response to) a UE requesting to initiate a new communication session of a different type from any other communication session in which it is currently engaged. Of course, method 500 could additionally or alternatively be implemented in other scenarios.

VI. CONCLUSION

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

The invention claimed is:

1. A method comprising:
   determining, by a network component of a radio access network, from a plurality of possible communication types, a communication type of a communication associated with a user equipment (UE), wherein the UE is capable of coordinated multipoint (CoMP) communication via an access network;
   using, by the network component, the determined communication type as a basis for setting a value of a maximum size parameter for a CoMP cooperating set for the UE, wherein the cooperating set specifies one or more cells to provide CoMP service to the UE; and
   selecting, by the network component, one or more cells to include in the CoMP cooperating set for the UE, wherein a total number of cells selected is less than or equal to the determined value of the maximum size parameter,
   wherein setting the maximum size parameter for the CoMP cooperating set comprises:
      when the communication type is determined to be a first communication type having a guaranteed bit rate (GBR), setting the maximum size parameter to a first value; and
      when the communication type is determined to be a second communication type that does not have a guaranteed bit rate, setting the maximum size parameter to a second value, wherein the second value is less than the first value.

2. The method of claim 1, wherein determining the communication type of the communication associated with the UE comprises determining a quality-of-service (QoS) level of the communication.

3. The method of claim 1, wherein determining the communication type of the communication session associated with the UE comprises determining a quality-of-service class identifier (QCI) of the communication.

4. The method of claim 3, wherein setting the maximum size parameter for the cooperating set comprises using the QCI of the communication as a basis for determining the maximum size for the cooperating set.

5. The method of claim 3, wherein setting the maximum size parameter for the cooperating set comprises using QCI-level-to-maximum-size mapping data as a basis for determining the maximum size for the cooperating set.

6. The method of claim 1, wherein the maximum size parameter indicates a maximum number of cells that can be included in the cooperating set for the UE.

7. The method of claim 1, wherein determining the communication type of the communication comprises:
   determining a quality-of-service class identifier (QCI) of the communication; and
   determining whether a resource type of the QCI is GBR or non-GBR.

8. The method of claim 1, wherein determining the communication type of the communication comprises determining a measure of latency sensitivity.

9. The method of claim 1, wherein determining the communication type of the communication associated with the UE comprises determining whether or not the communication is classified as a latency-sensitive communication.

10. A method comprising:
    determining, by a network component of a radio access network, determining whether or not a communication is classified as a latency-sensitive communication, wherein the communication is associated with a user equipment (UE) that is capable of coordinated multipoint (CoMP) communication via an access network;
    using, by the network component, the determination as to whether or not the communication is classified as a latency-sensitive communication as a basis for setting a value of a maximum size parameter for a CoMP cooperating set for the UE, wherein the cooperating set specifies one or more cells to provide CoMP service to the UE, and wherein setting the maximum size parameter for the CoMP cooperating set comprises:
       when the communication is classified as a latency-sensitive communication, setting the maximum size parameter to a first value, wherein the maximum size parameter specifies a maximum number of cells that can be included in the CoMP cooperating set; and
       when the communication is not classified as a latency-sensitive communication, setting the maximum size parameter to a second value, wherein the second value is less than the first value; and
    selecting, by the network component, one or more cells to include in the CoMP cooperating set for the UE, wherein a total number of cells selected is less than or equal to the determined value of the maximum size parameter.

11. The method of claim 1, further comprising:
    in addition to using the determined communication type as a basis for setting the maximum size parameter for the CoMP cooperating set, using the determined communication type as a basis for adjusting at least one other parameter affecting a likelihood that a given cell will be included in the CoMP cooperating set for the UE.

12. A system comprising:
    a communication interface operable for cellular communications with user equipment (UE);
    at least one processor; and
    program instructions stored in a non-transitory computer readable medium and executable by at least one processor to:
       (a) determine, from a plurality of possible communication types, a communication type of a communication associated with a user equipment (UE), wherein the UE is capable of coordinated multipoint (CoMP) communication via an access network, wherein determining the communication type comprises determining whether or not the communication is classified as a latency-sensitive communication;
       (b) based at least in part on the determined communication type, set a value of a maximum size parameter for a CoMP cooperating set for the UE, wherein the CoMP cooperating set specifies one or more cells to provide CoMP service to the UE, and wherein: (i) when the communication is classified as a latency-sensitive communication, the maximum size parameter is set to a first value, and (ii) when the communication is not classified as a latency-sensitive communication, the maximum size parameter is set to a second value, wherein the second value is less than the first value; and (c) select one or more cells to include in the CoMP cooperating set for the UE, wherein a total number of cells selected is less than or equal to the determined value of the maximum size parameter.

13. The system of claim 12, wherein the determination of the communication type of the communication comprises a determination of determining a quality-of-service class identifier (QCI) of the communication.

14. The system of claim 12, further comprising a non-transitory computer readable medium having QCI-level-to-maximum-size mapping data stored thereon.

15. The system of claim 12, wherein the program instructions executable to determine of the communication type are executable to:

determine a quality-of-service class identifier (QCI) of the communication; and determine whether a resource type of the QCI is guaranteed bit rate (GBR) or non-GBR.

16. The system of claim 15, wherein the setting of the maximum size parameter for the CoMP cooperating set comprises:

when the resource type of the determined QCI is GBR, setting the maximum size parameter to a first value, wherein the maximum size parameter specifies a maximum number of cells that can be included in the CoMP cooperating set; and when the resource type of the determined QCI is non-GBR, setting the maximum size parameter to a second value, wherein the second value is less than the first value.

\* \* \* \* \*